Oct. 29, 1935. P. PAUME 2,018,971
MACHINE FOR TESTING THREADS
Filed March 21, 1932 2 Sheets-Sheet 1

Inventor
Paul Paume
By Raymond Oe. Rosei
Attorney

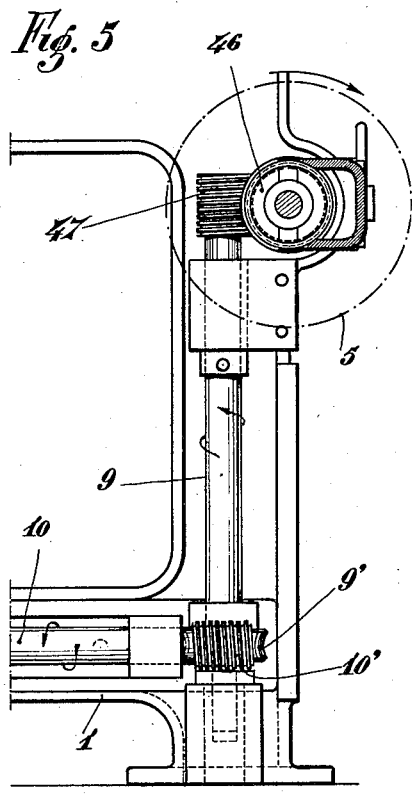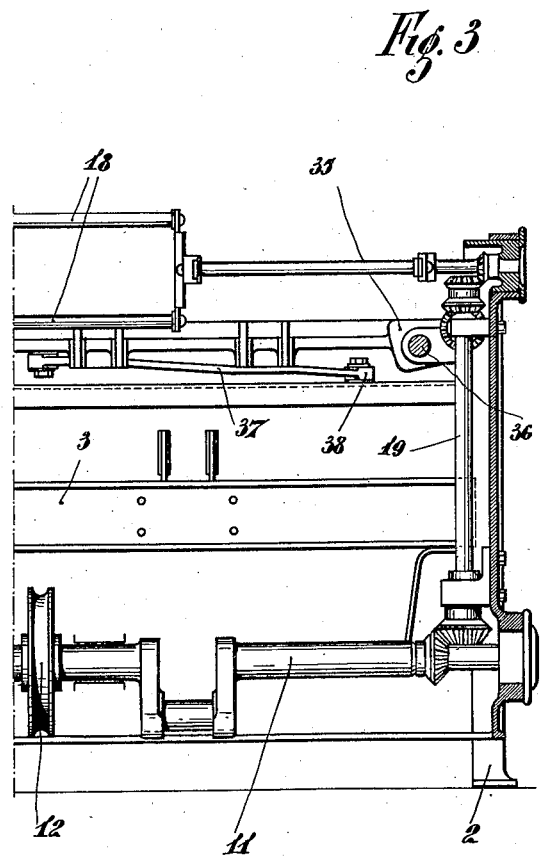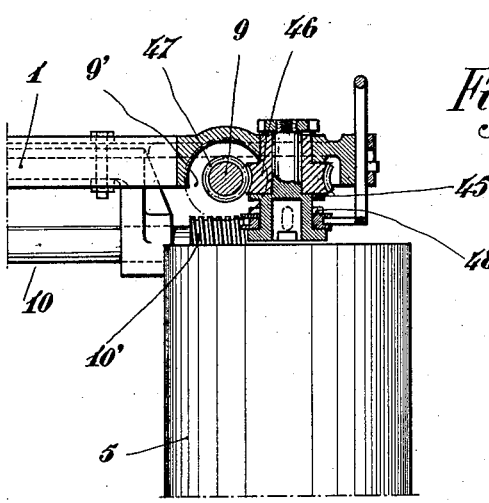

Patented Oct. 29, 1935

2,018,971

UNITED STATES PATENT OFFICE 2,018,971

MACHINE FOR TESTING THREADS

Paul Paume, Lyon, France

Application March 21, 1932, Serial No. 600,280
In France March 21, 1931

3 Claims. (Cl. 73—51)

The object of the present invention is to provide a machine for the rational testing of threads for use in weaving. More particularly, the object of the machine is to estimate the degree of resistance, regularity, elasticity, tenacity and aggregation of the threads, under conditions similar to those in which they are used as warp threads in a weaving loom.

The annexed drawings show, by way of example, one constructional form of the present invention.

Fig. 3 is a transverse section on line B—B of Fig. 2 and showing particularly the means for driving the whirl;

Figs. 5 and 6 show respectively elevation and plan views of roller mechanism clutching means.

Figure 1:
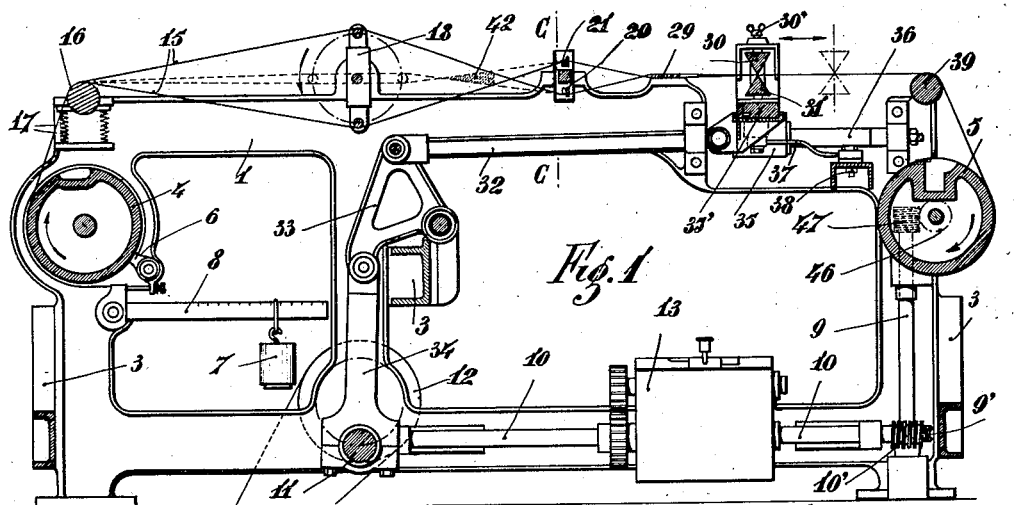
Fig. 1 is a longitudinal section of the machine along line A—A of Fig. 2.

The machine comprises a structure formed of frame members 1 and 2 connected together by cross-members 3.

At the two ends of the structure are mounted rollers 4 and 5, journalled in bearings provided on the frame members of the structure.

On the roller 4 used for unwinding, the threads to be tested are previously arranged, by means of a warp-beam, the unwinder being under the action of a brake 6, the action of which can be precisely regulated by a counter-weight 7 which is movable along a graduated lever 8.

The second or winding roller 5, is actuated mechanically at a predetermined speed by means of shaft 9 having a worm-gear 9' driven by a worm 10' secured to shaft 10, movement of said shaft 10 being had from a crank-shaft 11, which is actuated by a pulley 12, or any other means of transmission. The shaft 10 is coupled to a change speed box 13, which permits of the variation at will of the number of revolutions of the roller 5. The latter can also be put out of action by means of a declutching apparatus 14 comprising clutch teeth 45 and a worm gear 46 driven by a worm 47 disposed at the end of shaft 9. A movable toothed clutch member 48 is splined on the shaft of roller 5 and insures clutching whenever it is engaged with teeth 45. On leaving the roller 4, the threads 15 pass over an intermediate roller 16 revolving in bearings supported by springs 17. The threads are then directed to the whirl 18 which is rotated from the crank-shaft 11 by means of a vertical shaft 19 and gearing, or by any other suitable means.

On leaving the whirl the threads are crossed and are arranged in notches provided in two bars 20 and 21 of the tension-regulating frame. The two bars 20 and 21 are reciprocated in opposite directions, this movement being obtained by the aid of a cam 22 mounted on a vertical shaft 23 driven by a horizontal shaft 24, which is driven by the vertical shaft 19.

The cam 22 acts upon the lower bar 20, which actuates the upper bar 21 through rockers 25 oscillating freely about shafts 26 mounted on a fixed bar 27. These bars are supported by brackets 20' to secure the same and permit their disassembly.

The lower bar 20 is maintained in contact with the cam 22 by means of a spring 28 arranged at the opposite extremity of the tension-regulating frame.

On leaving the said frame, the threads cross again on the flat spreading and dividing bar 29 where they are directed on to rubbing members 30 and 31. The latter are capable of relative adjustment to a very fine degree by means of a suitable micrometer control comprising screws 30' (Fig. 1), and they are also movable longitudinally and transversally of the frame.

Figure 2:
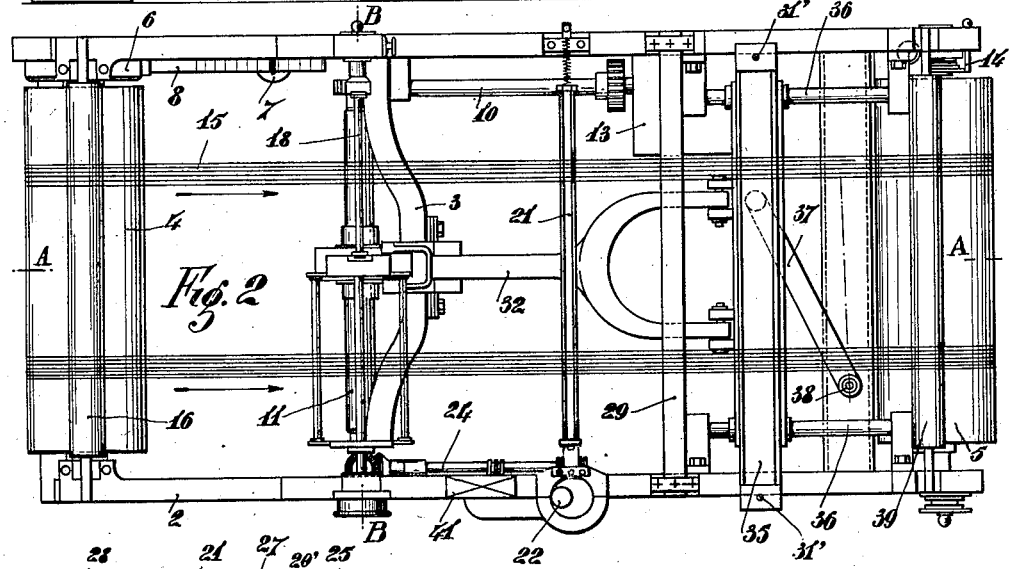
Fig. 2 is a plan view thereof.
Figure 4:
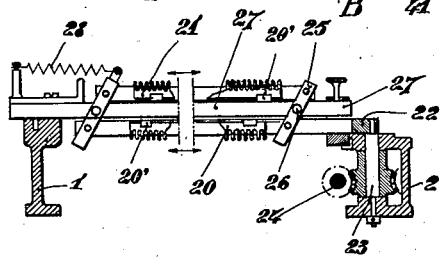
Fig. 4 is a fragmentary sectional view on line C—C of Fig. 1 and showing the driving mechanism of the tension regulating frame.

This micrometer control consists of thumb screws 30' securing the upper member 30 while the lower member 31 is more or less drawn to, or away from, member 30 by means of screws 31' (Fig. 2) threaded into 35'. These screws 31' by their projection above 35' vary the height of member 31 resting thereon.

The longitudinal movement relative to the frame structure is obtained by means of a connecting-rod 32, a linking lever 33 and a connecting-rod 34 mounted on the crank-shaft 11, which transmits a reciprocating movement to a slider 35 mounted on guides 36.

The transversal movement relative to the frame structure of the members 30 and 31 is obtained as follows: the members 30 and 31 are both displaced alternatively towards the front end to the rear of the machine, and vice versa, due to their supporting slider 35 receiving this oscillating movement from rod 32 through the intermediary of rod 34 and linking lever 33. On the slider 35 is disposed a transversely sliding member 35' supporting the members 30 and 31 and to which is connected a rod 37 pivoted at 38. When the slider 35 is moved longitudinally of the machine, the sliding member 35' is oscillated transversely due to the obliquity changes of rod 37. On leaving the rubbing members, the threads pass over intermediate rollers 39 and then to the roller 5.

The machine is also provided with a counter 41, actuated by the shaft 24 and indicating the number of the machine revolutions for a time which is a function of said machine speed, as well as that which is in the course of execution.

The apparatus operates as follows:—

The warp threads, in the form of a sheet, pass from the roller 4 to the other roller 5 continuously driven at variable speeds by means of gear box 13, whereby 4 is normally entrained by 5. In other words, the winding speed of 5 is practically the same as that of 4. The tension on the threads is obtained by the braking of the roller 4 by the brake 6, the braking being regulated by the counter-weight 7 carried by the lever 8. The tension may be controlled and rectified as desired by the displacement of a weight 7 movable on a graduated scale provided on the lever 8, by the aid of a dynamometer. This arrangement allows the total tension on the sheet of threads to be regulated by reason of the force proportioned to each thread; that is to say, established in deniers (or ½ decigramme).

When the machine is in operation, the means of supplementing the tension is obtained by the rising and falling of the threads brought about by the rotation of the whirl 18.

The frictional action is produced:

1st: by the strokes of the two articulated rubbing members 30 and 31 reproducing double friction on the thread in the comb teeth.

2nd: by an action from thread to thread, which has as its object to reproduce entirely the action of the warp threads in the shed and which is obtained as follows:—

The sheet of threads is divided three times. The first division receives the tension whirl 18, the second receives the tension-regulating frame and the third maintains the sheet in its position by a flat spreading and dividing bar 29.

The separated warp divided into two equal sheds, rests in the teeth of the bars 20 and 21 which regulate the distance of all the threads from each other. The reciprocating movement of the bars 20 and 21 in two directions is translated into an even frictional movement of the threads between each other at each movement of the whirl 18, over a length indicated by the hatched part 42 (Fig. 1). This frictional action is of variable intensity according to the amount of movement longitudinally of the frame of the bars 20 and 21, the variation of which is obtained by the employment of cams 22 of different eccentricity and also according to the tension of the sheet regulated by the braking of the roller 4 under the action of the brake 6.

The object of the machine is thus to eliminate the defective passages of threads; threads which are fine, thin, delicate, damaged, opened, curled etc., by reproducing the resistances to the action of the warp threads in the strokes of the parts of the loom.

It will be understood that the mechanisms indicated for producing the movements hereinbefore described, could be modified or obtained in any other appropriate manner in order to carry out the invention.

This machine permits the obtaining economically, rapidly, simply and exactly of the classification of threads employed in weaving and, consequently, of determining their exact commercial value.

Furthermore, the invention furnishes the indispensable and necessary indications for the judicious employment in weaving of any textile, according to its characteristic qualities.

I claim:

1. A machine for the testing of threads comprising two contiguous rubbing members between which a web of threads may be run, means for reciprocating said members in two directions so as to cause the threads to rub upon each other, means whereby the rubbing action may be regulated, so as to reproduce the action of friction on the warp threads in looms for detection by rupture of the presence of defective threads, the alternative threads forming said web being crossed forming two sheds, rotating means between said sheds for increasing and decreasing their distance apart in order to test the tenacity and elasticity of the threads.

2. A machine for the testing of threads comprising two contiguous rubbing members between which a web of threads may be run, means for reciprocating said members in two directions so as to cause the threads to rub upon each other, means whereby the rubbing action may be regulated, so as to reproduce the action of friction on the warp threads in looms for detection by rupture of the presence of defective threads, the alternative threads forming said web being crossed forming two sheds, rotating means between said sheds for increasing and decreasing their distance apart in order to test the tenacity and elasticity of the threads and means for reproducing the frictional action of threads in the teeth of a comb.

3. A machine for the testing of threads comprising two contiguous rubbing members between which a web of threads may be run, means for reciprocating said members in two directions so as to cause the threads to rub upon each other, means whereby the rubbing action may be regulated, so as to reproduce the action of friction on the warp threads in looms for detection by rupture of the presence of defective threads, the alternative threads forming said web being crossed forming two sheds, rotating means between said sheds for increasing and decreasing their distance apart in order to test the tenacity and elasticity of the threads, means for reproducing the frictional action of threads in the teeth of a comb, a winding roller upon which the threads from an unwinding roller are wound, and means adjustable according to threads being tested for regulating the unwinding of the threads from the unwinding roller and the winding thereof on to the winding roller for the purpose of obtaining fixed and exact measurements which, expressed in thread weight, automatically determine the size of the threads being tested.

PAUL PAUME.